(12) United States Patent
Fredrickson et al.

(10) Patent No.: US 9,645,621 B2
(45) Date of Patent: May 9, 2017

(54) SINGLE-PIN COMMAND TECHNIQUE FOR MODE SELECTION AND INTERNAL DATA ACCESS

(71) Applicant: Silicon Laboratories Inc., Austin, TX (US)

(72) Inventors: Russell B. Fredrickson, Camas, WA (US); Martin Pechanec, Portland, OR (US); Jeffery A. Battles, Portland, OR (US)

(73) Assignee: Silicon Laboratories Inc., Austin, TX (US)

( * ) Notice: Subject to any disclaimer, the term of this patent is extended or adjusted under 35 U.S.C. 154(b) by 399 days.

(21) Appl. No.: 13/768,556

(22) Filed: Feb. 15, 2013

(65) Prior Publication Data
US 2014/0237285 A1    Aug. 21, 2014

(51) Int. Cl.
| | | |
|---|---|---|
| G06F 1/04 | (2006.01) | |
| G06F 1/12 | (2006.01) | |
| G06F 5/06 | (2006.01) | |
| G06F 1/20 | (2006.01) | |
| G06F 1/06 | (2006.01) | |
| G06F 1/08 | (2006.01) | |
| G06F 1/22 | (2006.01) | |

(52) U.S. Cl.
CPC ............... *G06F 1/206* (2013.01); *G06F 1/04* (2013.01); *G06F 1/06* (2013.01); *G06F 1/08* (2013.01); *G06F 1/22* (2013.01); *Y02B 60/1275* (2013.01)

(58) Field of Classification Search
CPC ..... G06F 1/04; G06F 1/06; G06F 1/08; G06F 1/206; G06F 1/22; G06F 1/3203; G06F 1/3209; G06F 1/3234
See application file for complete search history.

(56) References Cited

U.S. PATENT DOCUMENTS

| | | | |
|---|---|---|---|
| 4,689,740 A | 8/1987 | Moelands et al. | |
| 5,301,023 A | 4/1994 | Zato | |
| 5,398,326 A | 3/1995 | Lee | |
| 5,451,912 A | 9/1995 | Torode | |
| 5,818,814 A * | 10/1998 | Testani | H04B 10/114 370/212 |
| 5,822,373 A | 10/1998 | Addy | |
| 5,841,717 A * | 11/1998 | Yamaguchi | G11C 11/4096 365/194 |
| 5,864,872 A | 1/1999 | Lee et al. | |
| 7,036,031 B2 * | 4/2006 | Takeuchi | 713/323 |

(Continued)

FOREIGN PATENT DOCUMENTS

WO    WO96/36953    11/1996

*Primary Examiner* — Thomas Lee
*Assistant Examiner* — Zhipeng Wang
(74) *Attorney, Agent, or Firm* — Zagorin Cave LLP

(57) ABSTRACT

A single pin is used to control an operating mode of an integrated circuit and to supply serial data to a host controller. The internal operating mode can be changed by changing a static level on an input/output terminal and maintaining that static level longer than a first time threshold. A read transaction from the integrated circuit can be performed in response to a predetermined sequence on the input/output terminal that includes a pulse that lasts a first predetermined time, the first predetermined time being less than the first time threshold.

21 Claims, 3 Drawing Sheets

(56) References Cited

U.S. PATENT DOCUMENTS

| | | | |
|---|---|---|---|
| 2005/0030156 A1* | 2/2005 | Alfonso | B60R 25/04 340/5.61 |
| 2006/0164061 A1 | 7/2006 | Formenti et al. | |
| 2008/0031167 A1* | 2/2008 | Chen | H04L 5/04 370/298 |
| 2008/0209250 A1* | 8/2008 | Fong | G06F 13/4282 713/500 |
| 2009/0013164 A1* | 1/2009 | Huang et al. | 713/2 |
| 2010/0082956 A1* | 4/2010 | Cheng et al. | 713/1 |
| 2010/0142295 A1* | 6/2010 | Seo | G11C 5/143 365/194 |
| 2010/0202626 A1* | 8/2010 | Shiori | H04R 1/1091 381/74 |
| 2010/0249886 A1 | 9/2010 | Park et al. | |
| 2011/0188292 A1* | 8/2011 | Joo | G11C 13/0064 365/148 |
| 2012/0149303 A1 | 6/2012 | Moes et al. | |
| 2012/0250746 A1* | 10/2012 | Sonntag | H04L 25/4902 375/224 |
| 2012/0303979 A1* | 11/2012 | Hung et al. | 713/300 |
| 2013/0007484 A1* | 1/2013 | Gobriel | G06F 1/3209 713/320 |
| 2013/0124121 A1* | 5/2013 | Hariharasudhan | G01R 31/3624 702/63 |
| 2015/0002199 A1* | 1/2015 | Hyun | H03L 7/00 327/160 |

\* cited by examiner

SINGLE-PIN COMMAND TECHNIQUE FOR MODE SELECTION AND INTERNAL DATA ACCESS

BACKGROUND

Field of the Invention

This application relates to communication between devices in a system.

Description of the Related Art

It is common in electronic systems to control operational modes of devices in the system that may affect power, which can be particularly important in battery operated devices. It is also common to obtain information related to operating conditions of devices in the system. However, for small form factor devices or devices with limited pins, there are often tradeoffs between control and communication functionality and the number of pins devoted to control and communication.

SUMMARY

Accordingly, a shared control and communication terminal on an integrated circuit allows a host controller to both control an operating mode of an integrated circuit coupled to the host controller and to receive serial data from the integrated circuit using a single terminal.

In one embodiment a method includes changing an internal operating mode of an integrated circuit responsive to a change in level on an input/output terminal that lasts longer than a first time threshold. The method further includes supplying serial data from the integrated circuit in a read transaction in response to a predetermined sequence on the input/output terminal that includes a pulse on the terminal that lasts a first predetermined time, the first predetermined time less than the first time threshold. Thus, one terminal can be used to both control the operating mode and supply serial data.

In another embodiment an integrated circuit includes an input/output terminal. A control circuit responds to a change in level on the input/output terminal that lasts longer than a first time threshold to change an operating mode of the integrated circuit. The control circuit is further responsive to a predetermined sequence on the input/output terminal that includes a pulse on the terminal that lasts a first predetermined time, the first predetermined time less than the first time threshold, to supply serial data from the integrated circuit to the input/output terminal as part of a read transaction.

In another embodiment a system includes a first device and a host controller. The first device includes an input/output terminal coupled to a signal line and a control circuit responsive to a change in level on the input/output terminal that lasts longer than a first time threshold to change an operating mode of the integrated circuit. The control circuit is also responsive to a predetermined sequence on the input/output terminal that includes a pulse on the terminal that lasts a first predetermined time, the first predetermined time less than the first time threshold, to supply serial data from the integrated circuit to the input/output terminal in a read transaction. The host controller is coupled to the signal line and configured to receive the serial data of the read transaction.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
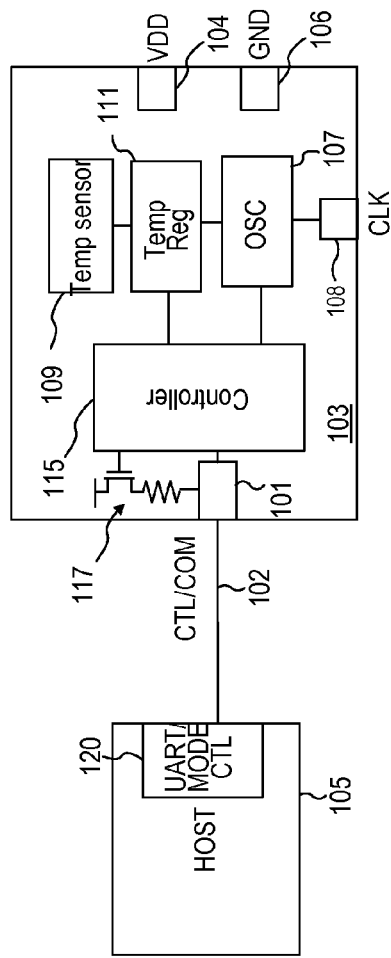
FIG. 1 is a high level block diagram of a device according to an embodiment of the invention.

Referring to FIG. 1, illustrated is an exemplary embodiment in which a shared control and communication terminal 101 on integrated circuit 103 allows a host controller 105 to control and communicate with integrated circuit 103 over control and communication (CTL/COM) signal line 102. In the embodiment illustrated in FIG. 1, the integrated circuit 103 has four terminals or pins including the control and communication terminal 101, which is coupled to the signal line 102, VDD 104, GND 106 and a clock output 108. The integrated circuit in the embodiment of FIG. 1 provides a clock signal generated in oscillator 107. The oscillator may have several modes of operation. For example, the oscillator may supply two different frequencies that can be selected using the control/communication terminal 101. In other embodiments, the integrated circuit may have different power modes. For example, in an embodiment, a low power mode may be implemented by turning off clock generation, temperature sensing, or other functionality in the integrated circuit 103. In another low power mode oscillator 107 supplies a clock signal with higher jitter than in a high power mode in which additional circuitry is employed to create a clock signal with less jitter. In an embodiment a change in the static level of the terminal 101 that lasts more than a predetermined amount of time (e.g., 100 µs) causes the internal chip mode to change (e.g., selects between low-power and high-power mode or between generation of a first frequency and a second frequency by oscillator 107). However, pulses on the shared control/communication terminal 101 that last less than the 100 µs threshold for a mode change (or another lower threshold), do not result in a change in the mode.

Instead, if a pulse or sequence of pulses of appropriate length (less than the mode change threshold) is detected in terminal 101, a command is executed such as a read back transaction to read back data contained in the integrated circuit 103 that the host controller 105 wishes to retrieve. In an embodiment, if a pulse is detected by controller 115 that has a polarity opposite to the steady state of the terminal just before the pulse, followed by a similar sized return to the original pin polarity, an internal data read back transaction is initiated. The original polarity of line 102 does not matter. If the original polarity is low, the pulse will be high and then the line 102 returns to low to end the pulse and if the original polarity is high, the pulse will be low and then line 102 returns to high. The host then brings the line high (or maintains the line high), before releasing it.

A keeper circuit 117, e.g., using a 3 KΩ resistor in integrated circuit 103 holds the line 102 high for a period of time. That period of time ensures that the host controller has stopped driving the line before the integrated circuit 103 drives the line with a START bit at 208. In an embodiment, the read back transaction is a standard 2-byte Universal Asynchronous Receiver Transmitter (UART) transaction and afterwards the integrated circuit stops driving the line 102 and holds the line high using the internal keeper for a certain period of time to allow the host to start driving the line 102 to a desired static value. Using the keeper for a certain amount of time helps ensure the host controller and the integrated circuit do not drive the line at the same time and the value on the line is not indeterminate. During this entire read back transaction, the internal mode of the chip is held constant. Once the keeper is released, the static level of the mode select pin may be again queried. Any static level change that lasts over the static threshold time causes a mode change. Thus, the general concept is to use an opposite-polarity pulse to allow commands without altering the main static operating state of the device. That feature allows host systems to proactively manage the operating state of the device 103, e.g., the power consumption, by only utilizing high power mode when the system requires it.

In an embodiment, the device 103 has the ability to provide its internal system temperature to the host device 101. That function allows the host to proactively adjust the system to compensate for temperature effects. In an embodiment, during normal operation, approximately once per second, the device 103 takes a temperature sample using an on-die temperature sensor 109 and internally stores the temperature in storage 111. Using the communication capability through the terminal 101, the temperature sample can be retrieved with the read back command to obtain, e.g., a stored 16-bit signed (2 s complement) temperature sample while maintaining the current operational mode.

Figure 2:
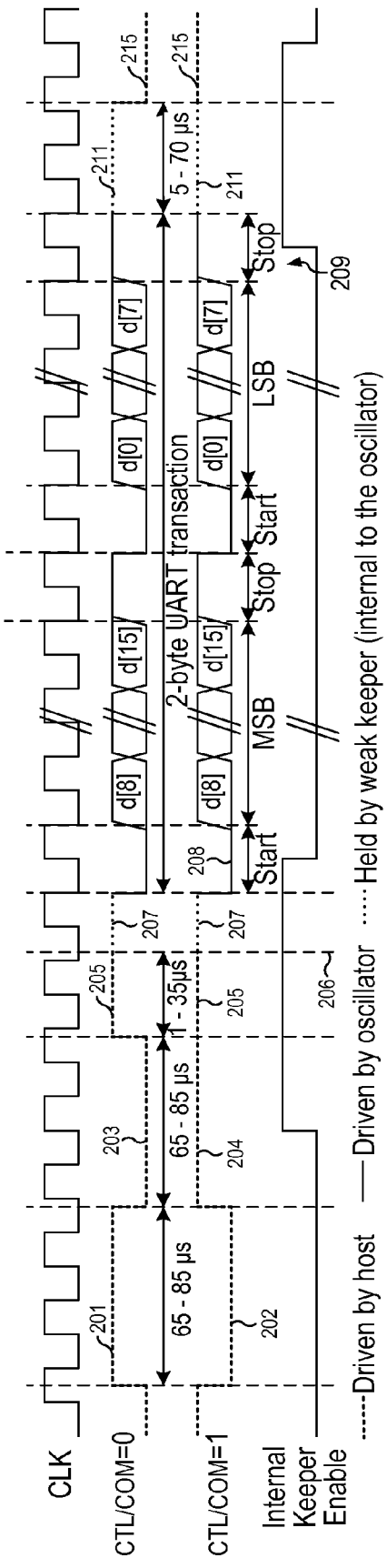
FIG. 2 is an exemplary timing diagram of serial communication between the host controller and a device.

FIG. 2 illustrates a timing diagram of an exemplary temperature sample transaction with the two different possible polarities for the initial value for control and communication signal line 102 (CTL/COM=1=high and CTL/COM=0=low). FIG. 2 also illustrates when the internal weak keeper 117 of device 103 engages during the transaction. For convenience, a host equipped with an internal UART controller 120 can enable an internal UART resource to receive the two-byte temperature sample and then disable the internal UART resource after the readout transaction completes. After the readout transaction completes, the host 105 returns to controlling the static level of the line 102 to control the mode of device 103.

Referring still to FIG. 2, to initiate a temperature sample transaction, the host that is driving the CTL/COM signal line 102 generates pulse 201 (or 202) by driving signal line 102 to its opposite polarity for a predetermined time period, e.g., 65-85 µs, and then returns the to the previous polarity for another predetermined time period 203 (or 204), e.g., for 65-85 µs. The host then drives the CTL/COM line high for another predetermined time period 205, e.g., 1-35 µs, before releasing the line at 206. After the host releases the line, the device 103 keeps the CTL/COM line 102 high at 207 using a weak keeper (e.g., approximately 3 kΩ) for a minimum of, e.g., 10 µs until device 103 starts driving the CTL/COM line low in 208 to start a 2-byte UART/serial style transaction with the MSB of the 16-bit temperature sample output first. Note that the weak keeper enable asserts during time period 203/204 in response to the device 103 recognizing a read back command. In the embodiment of FIG. 2, the transitions of the UART/serial style transaction are aligned to the negative edge of the CLK output. Note that during the serial transaction, static values on CTL/COM signal line 102 are ignored. That ensures that serial transfers of sequential ones or zeros do not trigger a mode change. After the bit-time of the second stop bit at 209, the device 103 keeps the CTL/COM line high at 211 for 5-70 µs until the host drives the CTL/COM line to its previous polarity at 215 before initiation of the read back transaction. Alternatively, the line 202 can be driven to the opposite polarity and maintained there by the host if a mode change is desired. Note that the specific times given for the various lengths of the sequence illustrated in FIG. 2 are exemplary and the actual times depend on the specific implementation of a particular embodiment.

Figure 3:
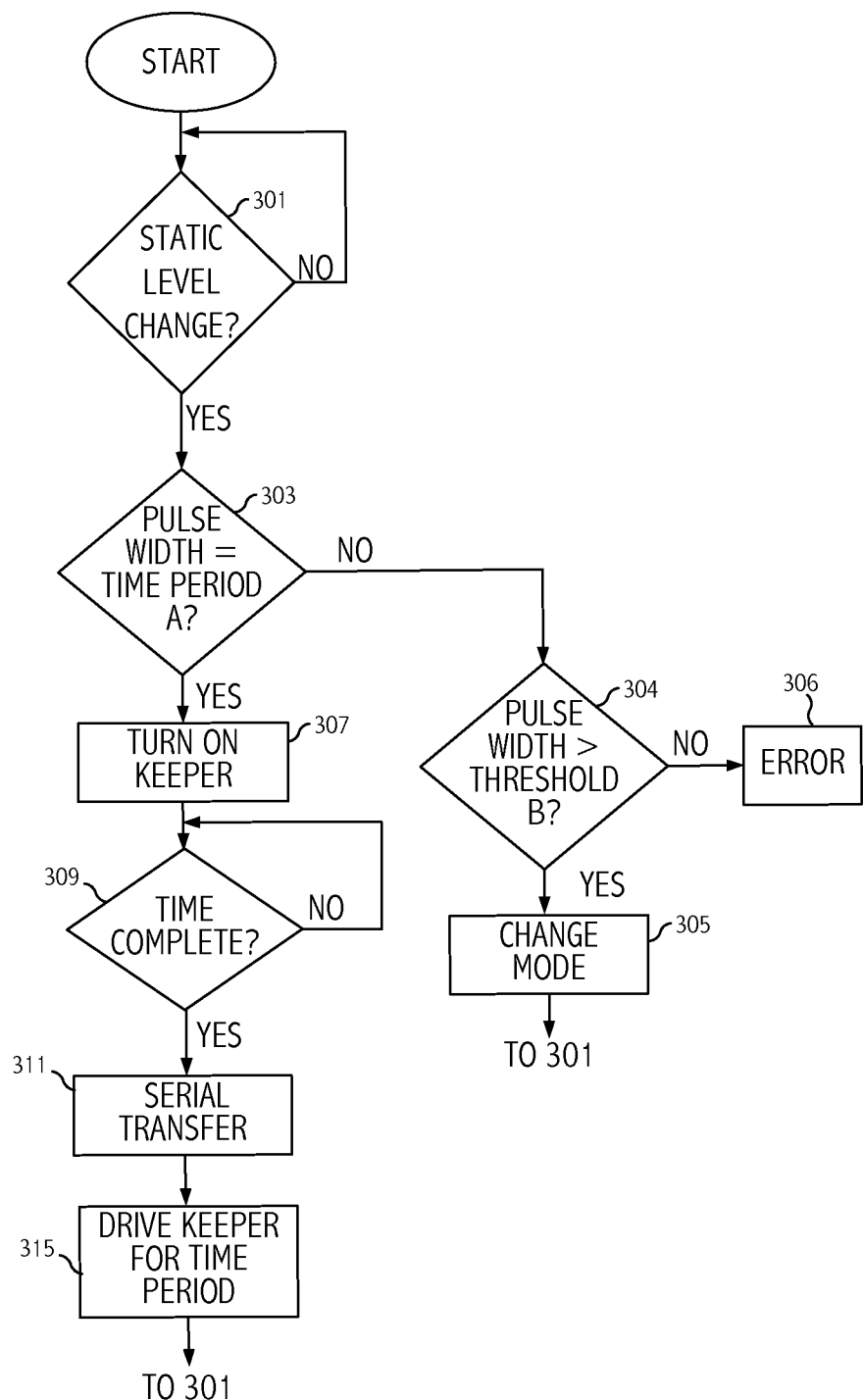
FIG. 3 is a high level flow chart of control functionality of an embodiment.

FIG. 3 illustrates an exemplary flow diagram illustrating the functionality of the control logic 115 controlling the mode select/read back protocol associated with CTL/COM line 102. The controller 115 may be implemented by a state machine, a programmed microcontroller, or any appropriate combination of control logic. Referring to FIG. 3, START may represent a power-on-reset or any other condition in which the interface for CTL/COM line 102 becomes active. In 301, the device 103 determines if a change in static level occurs. If change in static level occurs, a counter may be used in 303 to determine whether the change is a pulse having a width that equals a time period A, e.g., 65-85 µs. The counter may be a separate counter in controller 109 or part of a programmed microcontroller. If the pulse is not equal to time period A, the controller checks in 304 if the pulse width is greater than threshold B, e.g. 100 µs. If so, the pulse is determined to be a mode change, and the mode change is caused to happen, e.g., changing the power mode of the device 103 in 305. If the pulse width is not greater than the mode change threshold (threshold B), the control logic goes to error 306 for an appropriate error response. The response may be to log the error or simply return to 301 and wait for another pulse change, or both. In other embodiments the system does not have error 306 and either ignores the pulse, changes the mode, or performs a read back transaction when the pulse is not in the range of time period A and is less than threshold B according to system design. In other embodiments, the time period A may be a single time rather than a range and the counter may be used to determine if the timer period A<pulse width<threshold B. Thus, for example, in an embodiment a pulse less than 65 µs is ignored, a pulse greater than 65 µs and less than e.g. 100 µs initiates a read back transaction, and a pulse greater than 100 µs causes a mode change.

If however, a pulse is detected in 303 having a pulse width equal to time period A, e.g., the pulse 201 is detected, then the controller takes several actions in 307. One action is that the controller turns on the keeper circuit 117. As shown in FIG. 2, that occurs after the end of the pulse 201 during time period 203. The controller than waits in 309 an appropriate time period for the host to stop driving, e.g., shown as 203 and 205 in FIG. 2, and finally maintains the keeper through the time period 207. After that, the controller serially transfers the read data in 311. Finally, in 315, the controller completes the serial transfer and the device 303 turns on the weak keeper again during the STOP bit to ensure the line is defined at the end of the serial transfer. The device holds the line high at 211 (see FIG. 2) with the weak keeper until the host again drives the line at 215 (see FIG. 2).

In other embodiments multiple "commands" can be entered on the single wire interface by extending the threshold time for which pulses are ignored and creating opposite polarity pulse time windows where particular commands are valid. For example, opposite polarity pulses of 65-85 µs, 125 µs-145 µs, 185 µs-205 µs could all respectively initiate three different commands (some of which may include a read back as described above), while a transition that lasted more than 250 µs could indicate a transition on the steady-state mode behavior. All three commands may be read back commands with the different pulse widths identifying different data to send back.

Figure 4:
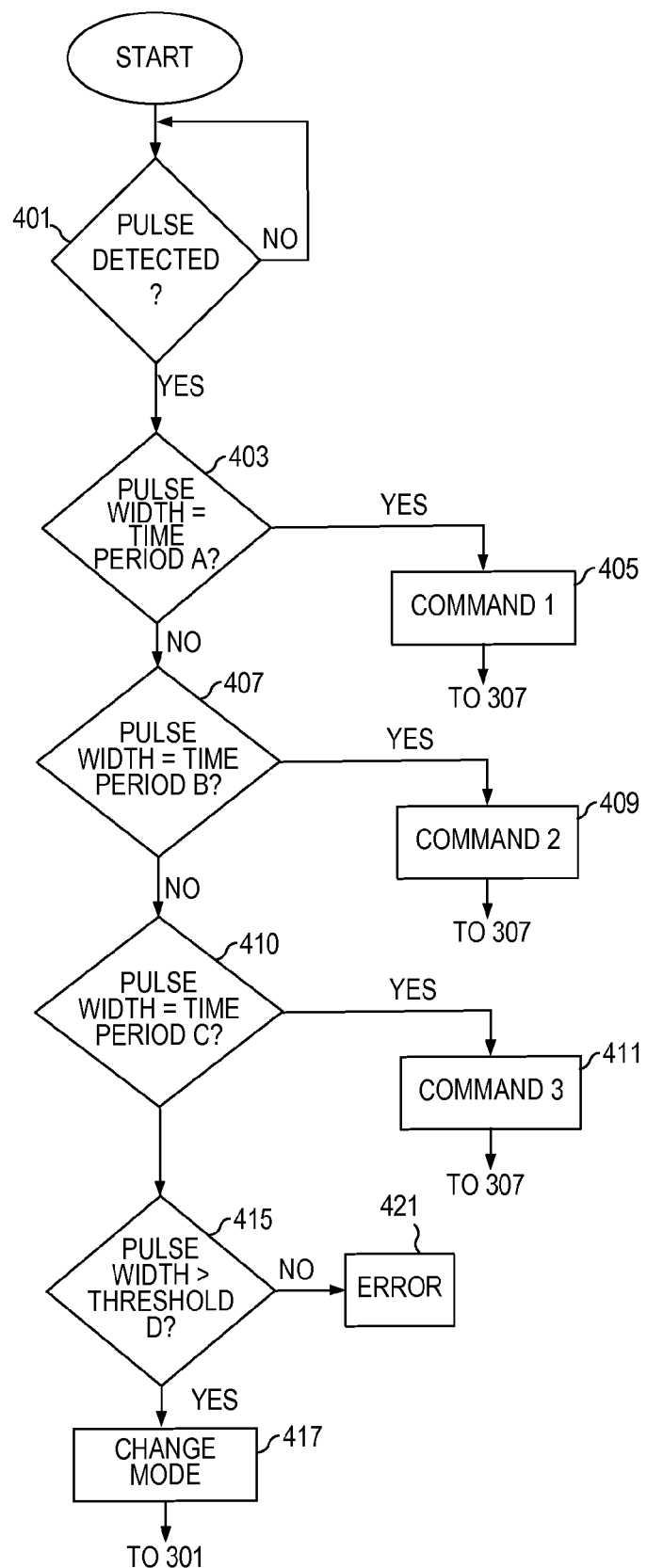
FIG. 4 is a high level flow chart of control functionality of another embodiment in which multiple commands are determined by different width pulses.

FIG. 4 illustrates a high level flow diagram of functionality associated with an embodiment in which three different commands may be determined based on different pulse widths. If static level changes in 401, then the control logic 115 first determines whether a pulse occurs having a width equal to time period A. For example, time period A may correspond to 65-85 μs. If so, then command 1 is executed in 405. Command 1 may be a serial transfer in which case the control logic goes to 307 (FIG. 3) to complete the serial transfer of the data designated by command 1. If a pulse equal to time period A is not detected, then in 407 the control logic checks if a pulse equal to time period B occurs. Time period B may correspond, e.g., to a pulse of 125 μs-145 μs. If such a pulse is detected, command 2 is executed in 409. If command 2 is a read access command, the flow returns to 307 to complete a serial transfer of the data designated by command 2. If a pulse equal to time period B is not detected, then in 410 the control logic checks if a pulse equal to time period C occurs. Time period C may correspond, e.g., to a pulse of 185 μs-205 μs. If such a pulse is detected, command 3 is executed in 411. If command 3 is a read access command, the flow returns to 307 to complete a serial transfer of the data designated by command 3. Finally, if a pulse equal to time period C is not detected, then in 415 the control logic checks if a static level greater than threshold D occurs. Threshold D may be, e.g., 250 μs. If so, then a mode change is initiated in 417. If not, an error condition is encountered and the control logic goes to error 421. Other embodiments may not recognize an error condition and instead will ignore the pulse or interpret the pulse as one of the three commands. The specific action the control logic takes may depend on system requirements. The control logic may simply return to 401. Alternatively, one of the commands may be to read an error register and thus an error code may be placed in the error register in response to the error condition.

While various commands may specify the type of data that is supplied in response to the command, such as temperature data, error data, a part identification number, or data relating to other operating conditions of the integrated circuit, the commands may also initiate other changes in device 103. For example, one of the commands may specify particular power levels or specific circuitry to be turned off or on in response to a mode change. The specific circuitry may relate to power savings or may relate to functionality that is to be enabled or disabled by the mode change.

Thus, a system has been described that uses an opposite-polarity pulse to allow commands without altering the main static operating state of the device that is controlled through the same terminal. The description of the invention set forth herein is illustrative, and is not intended to limit the scope of the invention as set forth in the following claims. For example, while the various descriptions herein have described a single pulse as part of the sequence causing a read transaction, other embodiments may use multiple pulses instead of a single pulse to indicate a read transaction. Other variations and modifications of the embodiments disclosed herein may be made based on the description set forth herein, without departing from the scope of the invention as set forth in the following claims.

What is claimed is:

1. A method comprising:
   changing an internal operating mode of an integrated circuit responsive to a change in a voltage level on an input/output terminal of the integrated circuit that lasts longer than a first time threshold;
   responsive to a predetermined sequence received on the input/output terminal, the predetermined sequence including at least one pulse on the input/output terminal that lasts a first time period, and the predetermined sequence being a read command identifying first information to be read, supplying the first information as serial data from the integrated circuit over the input/output terminal to a signal line in a read transaction corresponding to the read command, the first time period being less than the first time threshold;
   enabling a keeper circuit responsive to detecting receipt of the read command to couple the input/output terminal to a power supply node through the keeper circuit; and
   keeping the keeper circuit enabled for a second time period that overlaps with the predetermined sequence and overlaps with the integrated circuit driving the signal line as part of the read transaction.

2. The method as recited in claim 1 further comprising:
   a host device driving the predetermined sequence including,
   generating the pulse on the signal line coupled to the host device and coupled to the input/output terminal;
   after the pulse, holding the signal line at a value opposite the pulse for a third time period; and
   driving the signal line high for a fourth time period.

3. The method as recited in claim 1 wherein the first information is a temperature sample taken by the integrated circuit.

4. The method as recited in claim 1 further comprising:
   responsive to a second predetermined sequence including a second pulse that lasts a third time period, the third time period being less than the first time threshold, the second predetermined sequence being a second read command to read second information, supplying the second information as second serial data in a second read transaction corresponding to the second read command from the integrated circuit over the input/output terminal.

5. The method as recited in claim 4 wherein the second pulse is longer than the one pulse.

6. The method as recited in claim 5 wherein the first time period is a first time window between a first minimum time and a first maximum time and the second time period is a second time window between a second minimum time and a second maximum time.

7. The method as recited in claim 1 further comprising ignoring static values on the input/output terminal longer than the first time threshold during the read transaction.

8. The method as recited in claim 1 wherein the change in the internal operating mode changes a power setting of the integrated circuit.

9. An integrated circuit comprising:
   an input/output terminal;
   a control circuit responsive to a change in a voltage level on the input/output terminal that lasts longer than a first time threshold to change an operating mode of the integrated circuit;
   the control circuit responsive to a predetermined sequence on the input/output terminal, including at least one pulse on the terminal that lasts a first time period, the first time period less than the first time threshold, to supply first information as serial data from the integrated circuit over the input/output terminal in a read transaction, wherein the predetermined sequence is a read command identifying the first information to be read, and the read transaction corresponds to the read command; and a keeper circuit on the integrated circuit responsive to a control signal from the control circuit to couple the input/output terminal to a power supply node for a second time period, the second time period overlapping with the predetermined sequence.

10. The integrated circuit as recited in claim 9 wherein the predetermined sequence includes the pulse, the input/output terminal being held at a value opposite the pulse for a third time period after the pulse, and the input/output terminal being held high for a fourth time period immediately after the third time period.

11. The integrated circuit as recited in claim 9 wherein the keeper circuit comprises:

a resistor and a transistor serially coupled between the power supply node and the input/output terminal, a gate of the transistor coupled to the control circuit.

12. The integrated circuit as recited in claim 9 wherein the first information is a temperature sample taken by the integrated circuit.

13. The integrated circuit as recited in claim 9 wherein the first information is error data.

14. The integrated circuit as recited in claim 9 wherein the control circuit is further responsive to a second predetermined sequence including a second pulse that lasts a third time period, the third time period being less than the first time threshold, to supply second serial data in another read transaction from the integrated circuit.

15. The integrated circuit as recited in claim 14 wherein the second pulse is longer than the one pulse.

16. The integrated circuit as recited in claim 14 wherein the first time period is a first time window between a first minimum time and a first maximum time and the third time period is a second time window between a second minimum time and a second maximum time.

17. The integrated circuit as recited in claim 9 wherein the control logic is configured to ignore static values on the input/output terminal longer than the first time threshold during the read transaction.

18. The integrated circuit as recited in claim 9 wherein the change in the operating mode changes a power utilization level of the integrated circuit.

19. An apparatus comprising:
a first device including,
an input/output terminal coupled to a signal line;
a control circuit responsive to a change in a static level on the input/output terminal that lasts longer than a first time threshold to change an operating mode of the first device;
the control circuit further responsive to a predetermined sequence on the input/output terminal, including at least one pulse on the terminal that lasts a first time period, the first time period being less than the first time threshold, to perform a read transaction to supply first information as serial data from the first device to the signal line over the input/output terminal, the predetermined sequence being a read command identifying the first information to supply in the read transaction;
a keeper circuit responsive to a control signal from the control circuit to couple the input/output terminal to a power supply node for a second time period, the second time period overlapping with the predetermined sequence; and
a second device coupled to the signal line and configured to receive the serial data of the read transaction.

20. The apparatus as recited in claim 19 wherein the second device sends the read command over the signal line.

21. The apparatus as recited in claim 19 wherein the control circuit ignores static values on the input/output terminal longer than the first time threshold during the read transaction to thereby avoid changing the operating mode of the first device responsive to the serial data being supplied by the first device.

* * * * *